United States Patent [19]
Thumm et al.

[11] Patent Number: 5,187,847
[45] Date of Patent: Feb. 23, 1993

[54] TOOL TURRET WITH PNEUMATIC LOCKING SYSTEM

[75] Inventors: Helmut Thumm; Friedrich Handel, both of Metzingen, Fed. Rep. of Germany

[73] Assignee: Sauter Feinmechanik GmbH, Metzingen, Fed. Rep. of Germany

[21] Appl. No.: 886,253

[22] Filed: May 21, 1992

[30] Foreign Application Priority Data

May 23, 1991 [DE] Fed. Rep. of Germany ....... 4116774

[51] Int. Cl.$^5$ ..................... B23B 29/32; B23Q 17/00
[52] U.S. Cl. ............................. 29/48.5 A; 74/813 L; 74/826; 82/159
[58] Field of Search ................ 29/48.5 R, 48.5 A, 49; 74/813 L, 826; 82/159; 269/57; 409/221, 222, 223, 224

[56] References Cited

U.S. PATENT DOCUMENTS

| | | | |
|---|---|---|---|
| 3,718,055 | 2/1973 | Maier | 74/826 |
| 3,999,264 | 12/1976 | Carmen | 29/48.5 R |
| 4,989,303 | 2/1991 | Sauter et al. | 29/48.5 A |
| 4,991,474 | 2/1991 | Thumm et al. | 82/159 |

FOREIGN PATENT DOCUMENTS 1602775  4/1970  Fed. Rep. of Germany.
3814595  1/1989  Fed. Rep. of Germany.
2111873  7/1983  United Kingdom ................ 74/826

Primary Examiner—Z. R. Bilinsky
Attorney, Agent, or Firm—Roylance, Abrams, Berdo & Goodman

[57] ABSTRACT

A tool turret includes two toothed rims concentric to the rotary axis of its turret head and arranged radially adjacent to one another. One rim is immovable relative to the turret head. The other rim is immovable relative to the turret housing. The teeth of the toothed rims point toward a position-locking member arranged in an axial direction adjacent and coaxial to both of the toothed rims. The toothed rims can be held by a piston which is axially slidable to a position-locking setting, in which its teeth engage the teeth of the two toothed rims without any play. The piston is part of a pneumatic assembly. The angle formed by the sides of each tooth of the toothed rims and the position-locking member is reduced from the conventional value of 60° to a value in which the axial components effecting the tooth components of the tool reaction forces effective peripherally around the turret head is smaller than the sum of the axial force which can be produced by the piston and the axial force latent in the friction between the mating teeth.

17 Claims, 3 Drawing Sheets

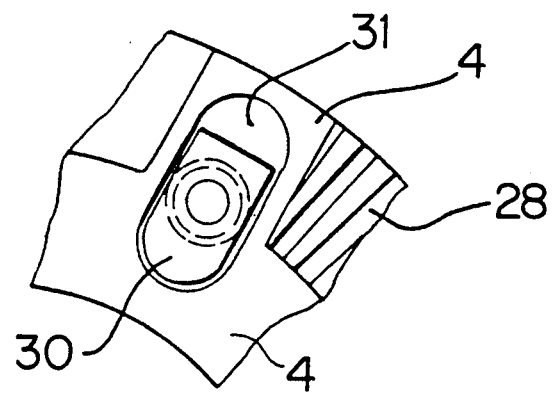
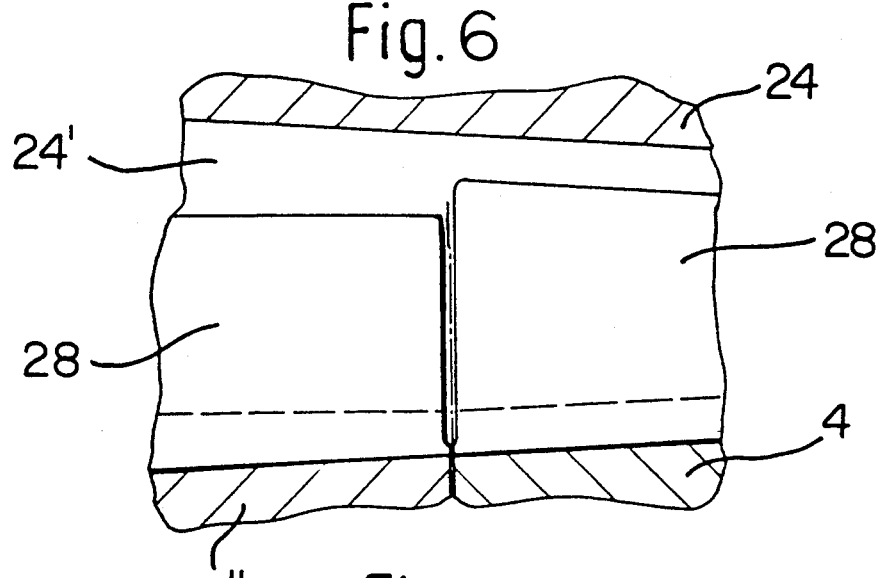
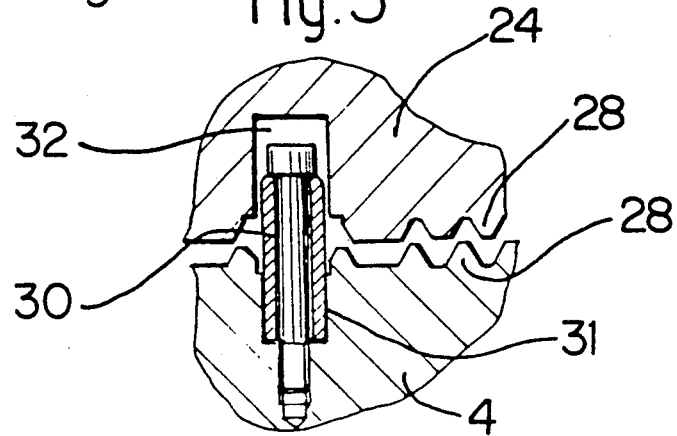

TOOL TURRET WITH PNEUMATIC LOCKING SYSTEM

FIELD OF THE INVENTION

The present invention relates to a tool turret which includes two toothed rims arranged concentric to the rotary axis of its turret head and radially adjacent to one another, and immovable relative to the turret head and turret housing, respectively. The rim teeth point toward a position-locking member arranged in an axial direction adjacent and coaxial to both of the toothed rims. The position-locking member can be held in a position-locking settling by an axially slidable piston, in which the position-locking member engages the teeth of the two toothed rims without any play.

BACKGROUND OF THE INVENTION

In known tool turrets of this type the toothed rims of the tool turret and the turret housing, as well as the tooth construction of the position-locking member, are configured as standard Hirth-type serrations with a 60° angle between the flanks of each serration. The piston is acted upon by hydraulic oil. The hydraulic power source producing force for pressing the position-locking member against the two toothed rims is advantageous since the effective piston surface can be relatively small. This advantage decreases the overall dimensions of the tool turret.

On the other hand, it is disadvantageous that a hydraulic system, to which the tool turret can be attached, must be present. The high pressure lines required between this hydraulic system and the tool turret and the piston together with the cylinder holding it form a heat source inside the tool turret. Such heat source leads to undesirable heat expansions, negatively effecting the precision of the processing.

SUMMARY OF THE INVENTION

An object of the present invention is to provide a tool turret which is simple and avoids the drawbacks of the hydraulic locking system.

This object is attained by a tool turret comprising a turret housing, a turret head mounted in the turret housing for rotation about a rotary axis, first and second toothed rims and a position locking member. The first and second toothed rims are mounted concentrically about the rotary axis and arranged radially relative to one another. The first toothed rim is immovable relative to turret head. The second toothed rim is immovable relative to the turret housing. Each of the toothed rims has teeth facing in an axial direction relative to the rotary axis. The position locking member is arranged in an axial direction adjacent to and coaxial to the teeth of the first and second toothed rims. The locking member includes teeth and an axially slidable piston for moving the locking member between a locking position in which the locking member teeth engage the first and second toothed rim teeth without play and a release position in which the locking member teeth disengage at least one of the first and second toothed rim teeth. Pneumatic pressure means are coupled to the piston for forcing the locking member toward the locking position. The flanks at each side of the teeth of the locking member and the first and second rims define an included angle less that 60° such that an axial component of a tool reaction force applied on the teeth peripherally around the turret head is smaller than a sum of an axial force produced by the piston and an axial force effected by the friction between said teeth.

Some pneumatic control system is conventionally present on any machine tool. Pneumatic operation of the piston is not expected to cause difficulties. For the most part, the connection lines need be configured only for a relatively low pressure, and therefore, the discharge air need not be fed back into the pneumatic system. Although the operational force of the piston is considerably minimized or reduced when transferring from hydraulic to pneumatic control of the piston, the tool turret according to the present invention need not to undergo great modification relative to the effective piston surface. This is because, as a result of the decrease of the included angle of each tooth's sides, the required position-locking force can be so greatly reduced that such force can be applied by the pneumatically operated piston without modification of its effective piston surface.

Despite the small side angle and the smaller, still tolerable imprecision with the orientation of the tooth constructions relative to each other, in order to still be able to carry out a subsequent engagement of these teeth whatever the circumstances, preferably the higher the teeth the wider is the maximum width of the spaces between the teeth. Since the maximum width of the spaces depends on the height of the teeth, the height of the teeth is determined such that, in all different positions of the prepositioned teeth, considering tolerances, the maximum width of each space is axially aligned with the respective tooth. This permits each tooth to enter the respective space by an axial movement. Furthermore, with reference to the small side angle, it is advantageous for the teeth to have to trapezoidal cross-sectional profile.

Outside forces generally apply a torque on the turret head and apply forces in a direction parallel to the rotary axis of the turret head. This leads to a tilt moment or tilting of the turret head so that the rotary axis would no longer be perpendicular to the turret head. In preferred embodiment, the turret head is propped or supported axially by initially compressed or stressed axial bearings on the turret housing. The piston thus need not apply the axial force required for compensation of this tilting moment from the outside.

One advantage of the pneumatically driven piston is that in the case of an overload, as can occur for instance upon collision of a tool with a workpiece, the piston subjected to air compression can be moved sufficiently far away from at least one of the two toothed rims that this toothed rim and the teeth of the position-locking member come out of engagement with each other. As a result of this arrangement, in such a case of excess charge, it is simple to prevent damage to or even destruction of the tool turret or its parts. For resetting the turret head into the original angle setting required following each such occurrence, it especially advantageous that the piston be relieved of pressure for the resetting process. The teeth then do not come into engagement with one another at high acceleration, as would be the case with rotation of the turret head, when the piston would be acted upon with the full air pressure component.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 4 is a partial plan view of the surface of the teeth on the side of the turret head of FIG. 1;

FIG. 5 is a partial side elevational view in section of the cam element of FIG. 4; and FIG. 6 is an enlarged side elevational view in section of the tool turret.

DETAILED DESCRIPTION OF THE INVENTION

Figure 1:
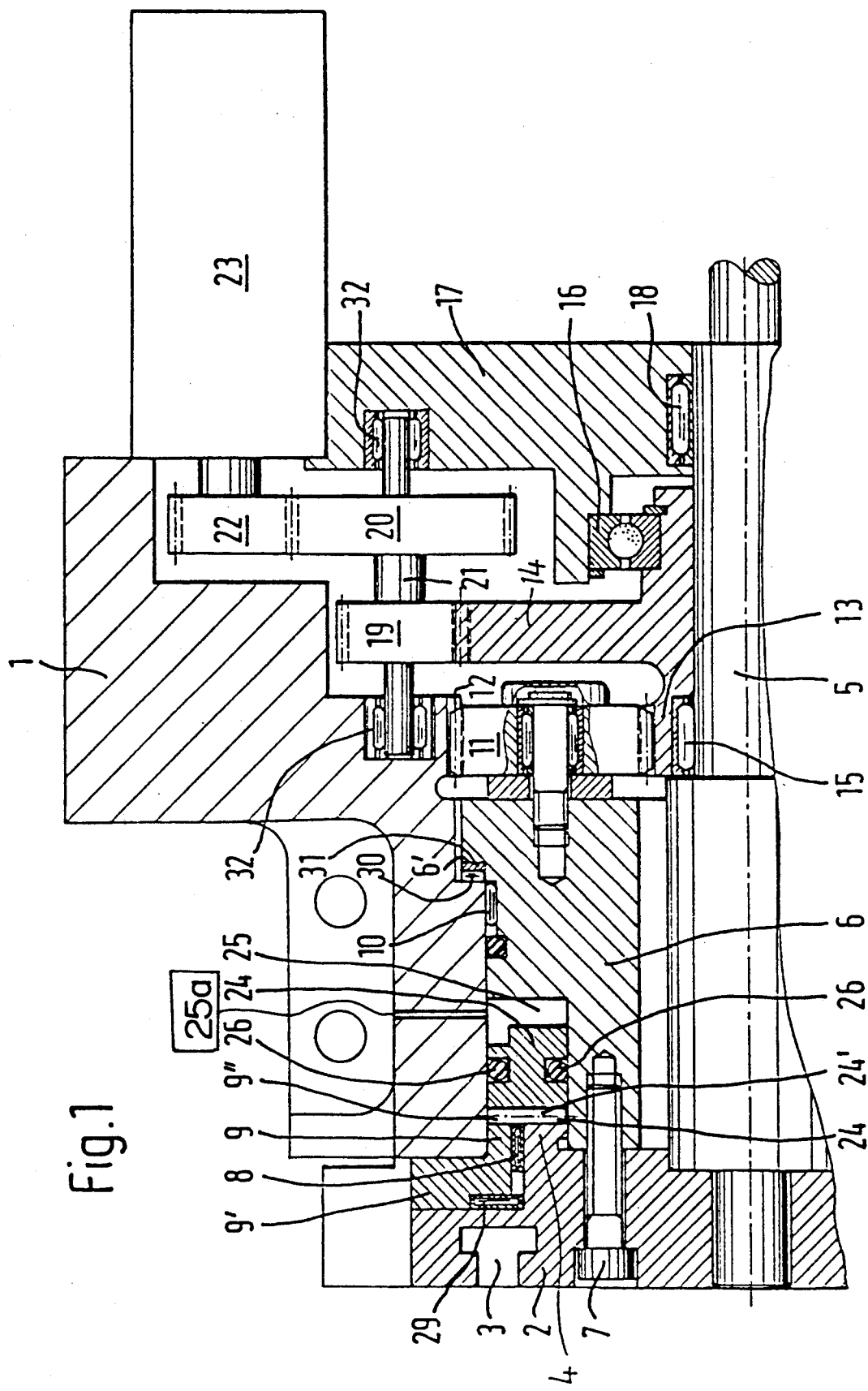
FIG. 1 is a partial side elevational view in section of a tool turret according to the present invention.

A tool turret with a disk-shaped turret head 2 is mounted rotatably in a turret housing 1. In a known manner, turret head 2 is provided with receiving areas 3 to serve as tool holders. A toothed rim 4 is provided on the side of turret head 2 facing toward the inside of turret housing 1. The toothed rim lies concentric to the rotary axis of turret head 2 and forms radial serrations pointing toward the inside of turret housing 1.

The rotary drive of turret head 2 rotates it into different angle settings which may be selected in the exemplary embodiment not directly by means of a central shaft 5, but rather by means of a hollow cylindrical body 6. Cylindrical body 6 surrounds a segment of shaft 5 concentrically. One working surface of cylindrical body 6 engages turret head 2. Screws 7 connect turret head 2 with hollow cylindrical body 6. The annular portion of turret head 2 supporting toothed rim 4 is supported on its outside cover surface by a bearing 8 on a ring 9. Ring 9 is connected with turret housing 1 and forms a flange 9' extending radially to the outside. Hollow cylindrical body 6 is mounted rotatably in turret housing 1 on a second radial bearing 10.

The rotation of hollow cylindrical body 6 is accomplished in the exemplary embodiment by a planet pinion 11. Planet pinion 11 is mounted rotatably in cylindrical body 6 adjacent to its surface facing away from turret head 2. This planet pinion 11 meshes both with a toothed rim 12 provided on turret housing 1 and with a driver 13. Driver 13 has a common driving collar with a toothed wheel 14 arranged axially adjacent to it. This common driving collar is mounted by a bearing 15 on shaft 5 and is mounted by a bearing 16 in a bore of an outside wall 17 of turret housing 1. In outside wall 17, the rear segment of shaft 5 is mounted by means of a bearing 18. Toothed wheel 14 stands in engagement with a driver 19. Driver 19 is mounted nonrotatably with a toothed wheel 20 on an auxiliary shaft 21 arranged parallel to shaft 5. Shaft 21 is mounted rotatably in turret housing 1 and outside wall 17 by bearing 32. A driver 22 engages toothed wheel 20 and is mounted on the shaft of a drive motor 23. Motor is tightly or fixedly fastened to turret housing 1 and to its outside wall 17.

Mounted securely on turret housing 1, ring 9 has a second toothed rim 9" in the form of a radial serration. The teeth 28 of rim 9" form a radial extension of the teeth 28 of toothed rim 4, if the teeth of rim 4 are aligned with the teeth of second toothed rim 9".

An annular piston 24 is provided for centering turret head 2 and for locking its position in any of the selected angle settings. The inside covering surface of piston 24 is aligned with the inside cover surface of toothed rim 4. The outside cover surface of piston 24 is aligned with the outside cover surface of second toothed rim 9". Both toothed rims 4 and 9" project into the annular work space 25 from one side of the space. Piston 24 is arranged axially slidable in work space 25 connected to a pneumatic pressure source 25a. As shown in FIG. 1, annular work space 25 is limited on the inside and on the end remote from turret head 2 by a groove-line recess formed in the hollow cylindrical body 6, and on the outside by the inside cover surface of turret housing 1.

Piston 24 is provided with annular grooves both in its outside cover surface and in its inside cover surface. Each groove receives an annular sealing ring or gasket 26. Piston 24 has a radial serration 24' on its front side turned toward toothed rim 4 and second toothed rim 9" forming teeth 28. Serration 24' is configured corresponding to and to mate with the serrations of the two toothed rims 4 and 9", so that turret head 2 can be positioned exactly in any selectable angle position and can be locked in position with turret housing 1 without any play.

The operating surface of piston 24 has the traditional dimensions for hydraulic operation, in order not to have to provide modifications insofar as the construction and the dimensions of the tool turret are concerned. However, compressed air having a pressure of only about 5 bar is provided for acting upon piston 24. The teeth 28 of both of the two toothed rims 4 and 9" and of radial serration 24' have a considerably smaller side angle (about 20°) than the traditionally used 60° Hirth serration.

Figure 3:
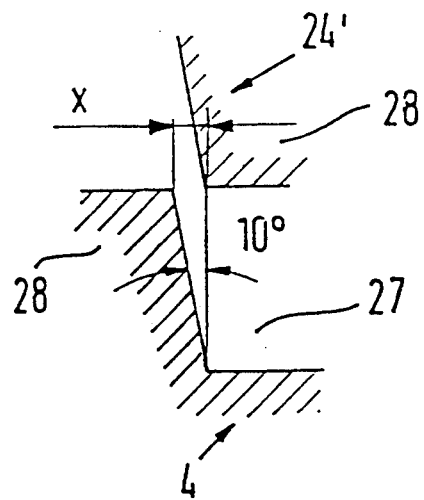
FIG. 3 is a partial, enlarged side elevational view in section of area III of FIG. 2.

Thus, on account of the unavoidable imprecision involved in prepositioning of the turret head (in other words for its alignment along the desired angle setting), for instance by means of a positioning drive, the maximum width of the spaces 27 between the teeth is of the required dimensions in cooperation with the corresponding width of the teeth 28 on its head, as shown especially in FIG. 3. The height of the teeth 28 is selected so that the maximum width of spaces 27 between the teeth is greater by 2X than the head width of teeth 28.

Figure 2:
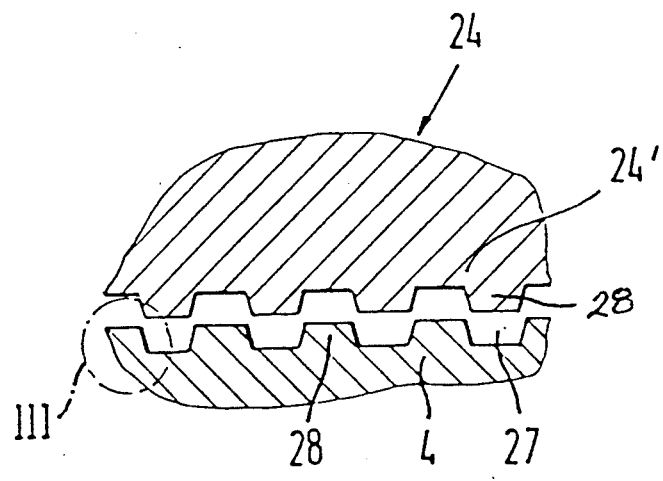
FIG. 2 is a partial side elevational view in section of the teeth of the turret head and position locking member.

The magnitude X depends upon the maximum tolerance accompanying the prepositioning. The trapezoidal dimensional forms shown in FIG. 2 is obtained for teeth 28 based upon this tooth height and the side angle. When the side angle of teeth 28 is selected to be 10°, the axial force produced by piston 24 is always greater than the components of the axial forces having an effect as reaction force of the tools tangentially from the outside on turret head 1.

Turret head 2 can also be provided and set up with tools producing reaction forces parallel to the rotary axis of turret head 2. To compensate, a first axial bearing 29 is arranged between the flange or side 9' of ring 9 and turret head 2, and a second axial bearing 30 is arranged between an inside shoulder of turret housing 1 and an outside shoulder 6' of hollow cylindrical body 6.

Axial bearings 29 and 30 are initially compressed or stressed, and in the exemplary embodiment, in such a manner that turret head 2 and hollow cylindrical body 6 are drawn together or forced toward each other by means of screws 7. Control of the magnitude of the initial stressing, for instance by means of an annular disk 31, permits adjustment between the outside shoulder 6' and the second axial bearing 30. The two axial bearings 29 and 30 completely absorb the maximum stress occurring as a result of outside forces which engage eccentrically in axial direction on turret head, and thus avoid compensation of this stress by the axial force of piston 24.

Since the side angle of teeth 28 still lies outside the automatic locking range, if the effective torque on turret head 2 exceeds a limit value, for instance as a result of a collision of a tool with a workpiece, piston 24 under the pressure of the compressed air acting upon it can be thrust so far that toothed rim 4 is released and turret head 2 can thus be rotated. Thus, it is advantageous to provide some protection against torsion, as disclosed in U.S. Pat. No. 4,989,303 to Sauter et al, the subject matter of which is hereby incorporated by reference, to assure synchronization of piston 24 with turret head 2. Such protection against torsion can be manifested by at least one cam element, which extends in the direction of thrust of piston 24, engaging both the piston and the turret head.

Preferably, as illustrated in FIGS. 4 and 5, a plurality of cam elements 30 are distributed over the working surface of rim 4. The cam elements are arranged uniformly around the periphery and extend in axial directions. As shown in FIGS. 4 and 5, each cam element is mounted in a depression 31 in turret head 2 by a bolt. The protruding part of each cam element 30 engages in a depression 32 in the working surface of piston 24 supporting serration 24'. The depth of engagement of cam elements 30 in depressions 32 is greater than the depth of engagement of the serration 24' in the teeth 28 of rim 4 and rim 9". Therefore, the cam elements 30 remain in contact with piston 24, even during a collision when the teeth 28 of the piston 24 are brought out of engagement with the teeth 28 of ring 9 and rim 4. Turret head 2 in such a case can, therefore, only be rotated relative to ring 9, but not relative to the piston 24. In order to make the tool turret ready for operation again, then, following such a collision turret head 2 need only be rotated back into the original position with the aid of the drive motor. This is possible without further difficulty on the basis of the data coming from an angle position transmitter (not shown).

Another possibility resides in selecting the tooth height of the teeth of toothed rim 4 to be greater than that of second toothed rim 9", as illustrated in FIG. 6. It that manner, radial serration 24' of piston 24 can come out of engagement with the teeth of second toothed rim 9", without coming out of engagement with the teeth of toothed rim 4. With use of such protection against torsion following a collision, turret head 2 can be rotated back into its original setting by drive motor 23. During this return-rotation, piston 24 is preferably completely relieved of pressure.

Such pressure relief and balancing is also undertaken before turret head 2 is rotated into another angle setting, in order to be able to bring a different tool carried by the turret head into the work position. Following prepositioning of turret head 2 in the new angle setting, piston 24 is again acted upon with compressed air, so that its radial serration 24' comes into engagement with the teeth of toothed rims 4 and 9" without any play. Piston 24 is then still acted upon with compressed air.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:

a turret housing;

a turret head mounted in said turret housing for rotation about a rotary axis;

first and second toothed rims mounted concentrically about said rotary axis and arranged radially relative to one another, said first toothed rim being fixed relative to said turret head, said second toothed rim being fixed relative to said turret housing, each of said toothed rims having teeth facing in an a axial direction relative to said rotary axis;

a position locking member arranged in an axial direction adjacent to and coaxial to said teeth of said first and second toothed rims, said locking member including teeth and an axially slidable piston for moving said locking member between a locking position in which the locking member teeth engage the first and second toothed rim teeth without play and a release position in which the locking member teeth disengage at least one of the first and second toothed rim teeth;

pneumatic pressure means coupled to said piston for forcing said locking member toward said locking position; and flanks at each side of said teeth of said locking member and said first and second rims defining an included angle less than 60° such that an axial component of a tool reaction force applied on said teeth peripherally around said turret head is smaller than a sum of an axial force produced by said piston and an axial force effected by the friction between said teeth.

2. A tool turret according to claim 1 wherein said teeth have a height; and a maximum width of spaces between said teeth depends on said height such that in all positions of prepositioned teeth each of said spaces is axially aligned with the respective tooth.

3. A tool turret according to claim 2 wherein said teeth have trapezoidal cross-sectional profiles.

4. A tool turret according to claim 1 wherein said teeth have trapezoidal cross-sectional profiles.

5. A tool turret according to claim 4 wherein said turret head is axially supported on said turret housing by prestressed axial bearings.

6. A tool turret according to claim 3 wherein said turret head is axially supported on said turret housing by prestressed axial bearings.

7. A tool turret according to claim 2 wherein said turret head is axially supported on said turret housing by prestressed axial bearings.

8. A tool turret according to claim 1 wherein said turret head is axially supported on said turret housing by prestressed axial bearings.

9. A tool turret according to claim 8 wherein torsion protection means secures said locking member against rotation relative to said turret head in said release position.

10. A tool turret according to claim 7 wherein torsion protection means secures said locking member against rotation relative to said turret head in said release position.

11. A tool turret according to claim 6 wherein torsion protection means secures said locking member against rotation relative to said turret head in said release position.

12. A tool turret according to claim 5 wherein torsion protection means secures said locking member against rotation relative to said turret head in said release position.

13. A tool turret according to claim 4 wherein torsion protection means secures said locking member against rotation relative to said turret head in said release position.

14. A tool turret according to claim 3 wherein torsion protection means secures said locking member against rotation relative to said turret head in said release position.

15. A tool turret according to claim 2 wherein torsion protection means secures said locking member against rotation relative to said turret head in said release position.

16. A tool turret according to claim 1 wherein torsion protection means secures said locking member against rotation relative to said turret head in said release position.

17. A tool turret according to claim 1 wherein said included angle is about 20 degrees.

* * * * *